United States Patent
Bucher

(10) Patent No.: US 6,254,032 B1
(45) Date of Patent: Jul. 3, 2001

(54) AIRCRAFT AND METHOD FOR OPERATING AN AIRCRAFT

(76) Inventor: Franz Bucher, Rebgasse 17, CH-4058 Basel (CH)

( * ) Notice: Subject to any disclaimer, the term of this patent is extended or adjusted under 35 U.S.C. 154(b) by 0 days.

(21) Appl. No.: 09/475,325

(22) Filed: Dec. 30, 1999

(30) Foreign Application Priority Data

Oct. 26, 1999 (CH) ................................................. 1959/99

(51) Int. Cl.⁷ ................................................. B64C 39/06
(52) U.S. Cl. .................... 244/12.2; 244/12.4; 244/23 C; 244/56
(58) Field of Search .............................. 244/12.2, 23 C, 244/56, 66, 12.4, 23 A

(56) References Cited

U.S. PATENT DOCUMENTS

| | | | |
|---|---|---|---|
| 2,876,965 | * 3/1959 | Streib | 244/12.2 |
| 3,082,977 | * 3/1963 | Arlin | 244/12.2 |
| 3,284,027 | 11/1966 | Mesniere | 244/12 |
| 3,335,977 | 8/1967 | Meditz | 244/12 |
| 3,410,507 | 11/1968 | Moller | 244/23 |
| 3,614,030 | 10/1971 | Moller | 244/23 C |
| 3,640,489 | * 2/1972 | Jaeger | 244/23 C |
| 3,985,320 | 10/1976 | Brady | 244/93 |
| 4,554,989 | * 11/1985 | Gruich et al. | 244/60 |
| 4,605,185 | * 8/1986 | Reyes | 244/60 |
| 4,613,097 | * 9/1986 | Jordan | 244/56 |
| 4,799,629 | * 1/1989 | Mori | 244/23 C |
| 5,242,132 | 9/1993 | Wukowitz | 244/106 |
| 5,383,627 | * 1/1995 | Bundo | 244/56 |
| 5,419,514 | * 5/1995 | Ducan | 244/56 |
| 5,895,011 | 4/1999 | Gubin | 244/12.1 |

FOREIGN PATENT DOCUMENTS

| 3829329A1 | 3/1989 | (DE) . |
|---|---|---|
| 1550060 | 11/1968 | (FR) . |

\* cited by examiner

*Primary Examiner*—Galen L. Barefoot
(74) *Attorney, Agent, or Firm*—Cooper & Dunham LLP; Donald S. Dowden

(57) ABSTRACT

The aircraft comprises a central cabin, which is located in the center of a circular wing. Several pivotal electric drive units are arranged in a gap between the central cabin and the circular ring. In hover flight, the drive units are pivoted to generate a lift. When the aircraft goes into cruise flight, the drive units are pivoted to generate a forward thrust. Attitude and movements of the aircraft can be controlled by individual or common adjustment of the thrust and pivot angle of the drive units. Due to its simple design, the aircraft is economic and safe in operation. Still it has a high payload for its size.

16 Claims, 2 Drawing Sheets

AIRCRAFT AND METHOD FOR OPERATING AN AIRCRAFT

CROSS REFERENCE TO RELATED APPLICATIONS

This application claims the priority of Swiss patent application 1959/99, filed Oct. 26, 1999, the disclosure of which is incorporated herein by reference in its entirety.

BACKGROUND OF THE INVENTION

The invention relates to an aircraft and a method for its operation, in particular an aircraft with electrically driven motors.

Modern aircraft must combine a high level of safety with economic efficiency. Hence, compromises have been made.

BRIEF SUMMARY OF THE INVENTION

Therefore, it is a general object of the invention to provide an aircraft and a method for operating an aircraft that are characterized by a high level of safety and economic efficiency.

Now, in order to implement these and still further objects of the invention, which will become more readily apparent as the description proceeds, the aircraft is manifested by the features that it comprises at least one generator for generating electrical power, at least one engine for driving said generator, and electrically driven drive units for generating lift and forward thrust.

In a further aspect of the invention, a method is provided for operating an aircraft, said aircraft comprising a fuselage, at least one generator of generating electrical energy, at least one engine for driving said generator, and electrically driven, pivotal drive units for generating lift and forward thrust, wherein each drive unit has a thrust axis, said method comprising the steps of adjusting said thrust axes of said drive units downwards for generating a lift for hover flight and adjusting said thrust axes of said drive units horizontally for generating a forward thrust for cruise flight, wherein in said cruise flight a lift is generated by an aerodynamic profile of said aircraft.

According to the invention, the power for the drives is generated by a combustion engine driving an electric generator. The power from the generator is used by the electrically operated drive units for generating lift and forward thrust of the aircraft. This combines the good ratio between weight and energy storage of a combustion engine with the reliability and fast response of electric motors. Since the engine drives a generator only, its operating parameters are exposed to lesser variations than those of conventional aircraft engines, which reduces the risk of defects and increases efficiency.

Some or preferably all of the drive units can be pivoted individually, such that their thrust can be adjusted according to demand. Since they use electric motors and no combustion engines, their reliable operation is not impaired by the pivotal movements. Preferably, the drive units can be pivoted from a vertical position up to a horizontal position. In the vertical position, they generate a lift that carries the aircraft in hover flight. In the horizontal position, they generate a forward thrust for a cruise flight of the aircraft.

The drive units are preferably designed to be ducted fans comprising at least one fan or impeller arranged in a tube-like hosing. Such ducted fans reach very high flow velocities and generate a low amount of noise.

By arranging the drive units on a circle, a configuration that is especially stable and easy to control is provided.

Preferably, the aircraft comprises a central cabin and a circular wing arranged around the cabin. The drive units are arranged between the cabin and the circular wing. A design of high symmetry is preferred, where a gap for receiving the drive units is provided between the central cabin and the circular wing, because such an aircraft can be assembled from few, simple units.

In their horizontal position, the thrust axes of the drive units should be arranged above the central plane of the circular wing, such that the airflow on its surface is increased and lift is improved.

Preferably, at least five drive units are used, because when using only four drive units, the loss of only one of them leads to a configuration that is impossible to control in most situations.

The aircraft can be operated in hover flight and cruise flight. In hover flight, the drive units are pivoted downwards to generate a lift for keeping the craft in the air. In cruise flight, the drive units are pivoted backwards to generate a forwards thrust, wherein the lift is dynamically generated by the profile of the fuselage.

The attitude of the aircraft, i.e. its pitch, roll and yaw can be controlled by pivoting the drive units and adjusting their thrust.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
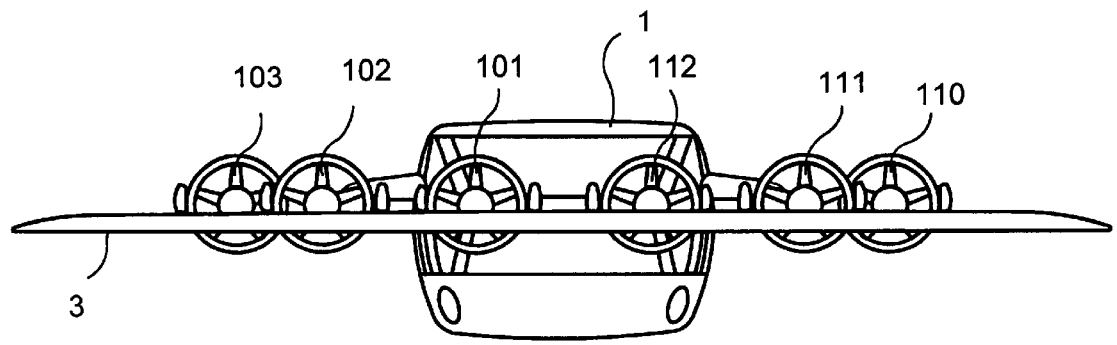
FIG. 1 is a front view of an embodiment of the invention in cruise flight.
Figure 2:
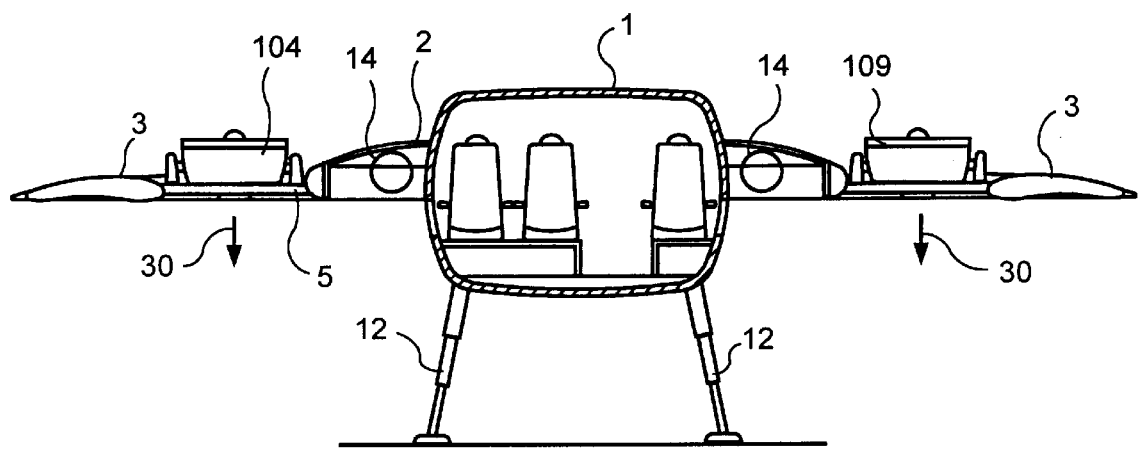
FIG. 2 is a sectional view of the craft of FIG. 1 in take-off position.
Figure 3:
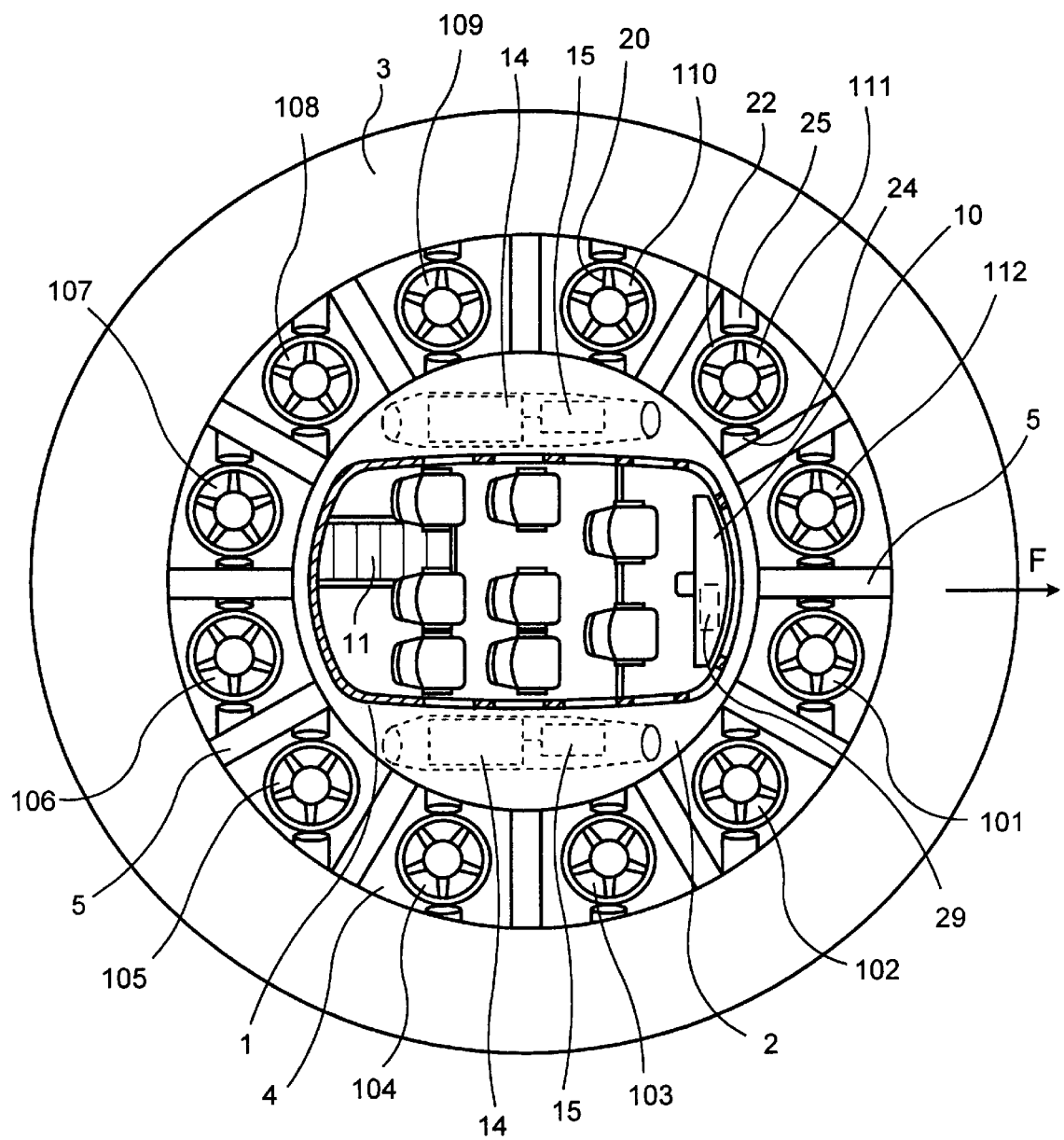
FIG. 3 is a horizontal, sectional view of the craft of FIG. 2.

The basic design of a preferred embodiment of the aircraft is shown in FIGS. 1–3. It comprises an elongate central cabin 1 arranged in the center of a central disc 2. A circular wing 3 is located concentrically around central disc 2. A ring-shaped gap 4 is arranged concentrically to and around central disc 2 and cabin 1. Radial spokes 5 are extending through gap 4. Twelve drive units 101–112 are located between the spokes 5 along the inner side of circular wing 3. The design and function of these drive units are explained in detail below.

As shown in FIGS. 2 and 3, the present embodiment of the aircraft offers space for two pilots and six passengers. Cabin 1 further provides room for a control console 10 and an entrance 11. Four pneumatically extensible legs 12 mounted on cabin 1 are used for parking and taxiing.

Two combustion engines 14 are arranged in central disc 2 lateral to cabin 1, each driving a generator 15. Generators 15 provide power for feeding the electrically driven drive units 101–112. The engines 14 and generators 15 are dimensioned such that there is sufficient power for a safe landing even after failure of one engine or generator.

Each drive unit comprises an electrically driven ducted fan with an impeller or ventilator 20 and an electric motor. The impeller or fan 20 is located coaxially in a tubeshaped duct 22. Duct 22 is pivotally mounted between two arms 24, 25. The pivotal position of the ducted fan is controlled by an electric actuator in a range of more than 90°. In particular, the drive units can be pivoted from the horizontal position shown in FIG. 1, where they generate a forward thrust for the aircraft, into the vertical position of FIG. 2, where they generate a lifting thrust.

As mentioned before, all drive units are fed by the generators 15, wherein the power of each drive unit is individually controlled by a schematically shown control unit 29. Control unit 29 can also control the pivotal position of each drive unit individually. All control signals required for this purpose are computed from the pilot's flight orders. The pilot does not need to worry about the adjustment of the individual components but merely indicates the parameters that he is interested in, such as pitch, yaw, and speed of his aircraft.

The aircraft can be operated in hover and cruise flight.

In hover flight as well as during starting and landing, the drive units 101–112 are pivoted such that they generate an airjet 30 directed downwards. This corresponds to the position shown in FIG. 2. The lift generated in this way is sufficient for keeping the fully loaded and tanked aircraft in hover.

Attitude and displacements of the craft in hover flight can be adjusted by the power and pivotal angles of the drive units 101–112.

For adjusting lift, the power of all drive units can be increased or decreased simultaneously. A roll of the craft is preferably controlled by reducing or increasing the power of the lateral drive units 103, 104, 109, 110, pitch by reducing or increasing the power of the forward and aft drive units 101, 112, 106, 107 and yaw by opposite pivoting the lateral drive units 103, 104, 109, 110.

Lateral offset of the craft can be achieved by reducing the thrust of the drive units on one side, which generates a slight roll resulting in a slightly lateral thrust.

Forward and backward movements of the craft can e.g. be controlled tilting all drive units.

In cruise flight with high velocity all drive units are preferably arranged parallel to flight direction F, as it is shown in FIG. 1, and they generate an airjet directed backwards and thereby a thrust for forward movement. The lift is generated by the aerodynamic profile of the craft (circular wing and cabin).

For attitude control in cruise flight, the pivotal angle and/or thrust of the drive units are adjusted. No flaps, rudders or ailerons are required.

In transition between hover to cruise flight, the drive units are brought from the vertical position of FIGS. 2 and 3 into the horizontal position of FIG. 1. For this purpose, all drive units can e.g. by pivoted simultaneously and slowly about 90°. Alternatively, the transition can be started by pivoting only a part of the drive units while the other drive units remain directed downwards.

The present embodiment of the craft is designed for vertical landing. For emergency landings, a parachute is arranged in the craft, which, together with the large wing area, is sufficient to break the fall sufficiently. In case of an emergency landing, the pneumatic legs 12 provide a crumple zone.

In case of a failure of drive power, the drive units can still be pivoted and be used as flaps, such that a gliding flight is possible.

The embodiment of the aircraft shown in FIGS. 1–3 has an outer diameter of approximately 8 meters and a wing area of approximately 29 m². It can be made of synthetic materials and has an empty weight of approximately 2 tons. The maximum take off weight is 4.2 tons with a redundant engine power of 2×1000 horse power and a total drive unit power of 60 kW. The aircraft can easily be scaled to different sizes.

Depending on the size of the craft, the number of drive units can be varied. At least five, preferably at least six drive units are preferred.

Because of the high symmetry of the craft and the application of several, identical drive units, the production as well as spare parts management and maintenance are substantially simplified. At the same time, the aircraft has high stability.

In the present embodiment, circular wing 3 of the craft is completely round. It is, however, possible to build a circular ring from several straight wing sections arranged substantially tangential around cabin 1. Or the wing can have oval shape. The term "circular wing" used in the claims is to comprise all such embodiments.

Other wing shapes, in particular triangular wings, could also be used.

The present craft is suited as passenger or cargo vehicle. Due to its ability to take off vertically, it can also be used in situations where space is limited.

Since several electric motors are used for the drive units, the aircraft can adapt very quickly when applied forces vary and it is very mobile. Furthermore, due to outer presence of many drive units, the individual motors are comparatively small such that they can react quickly.

While there are shown and described presently preferred embodiments of the invention, it is to be distinctly understood that the invention is not limited thereto but may be otherwise variously embodied and practiced within the scope of the following claims.

What is claimed is:

1. An aircraft comprising a centrally located cabin, a wing extending around said cabin, said wing having an outer edge and defining at least one opening between said outer edge and said cabin, at least one generator for generating electrical power, at least one engine for driving said generator, a plurality of electrically driven, individually pivotal drive units mounted in said at least one opening for generating lift and forward thrust, wherein said drive units can be pivoted from a vertical position to a horizontal position, and means for adjusting a power of at least part of said drive units individually, wherein in said vertical position said drive units generate a lift sufficient for lifting the weight of said aircraft, and wherein in said horizontal position said pivotal drive units generate a forward thrust while said lift is generated aerodynamically by said cabin and said wing.

2. The aircraft of claim 1 wherein each of said pivotal drive units is pivotal about a pivoting axis, wherein said pivotal axes are parallel to each other and perpendicular to a forward direction of said aircraft.

3. The aircraft of claim 1 wherein said drive units comprise ducted fans.

4. The aircraft of claim 1 wherein said drive units are arranged in a circle.

5. The aircraft of claim 1 comprising at least five drive units.

6. The aircraft of claim 1 comprising at least six drive units.

7. The aircraft of claim 1 wherein each drive unit comprises a fan.

8. The aircraft of claim 1 wherein all said drive units are substantially identical.

9. The aircraft of claim 1 wherein each of said drive units comprises an electric motor.

10. A method for operating an aircraft, said aircraft comprising a centrally located cabin, a wing extending around said cabin, said wing having an outer edge and defining at least one opening between said outer edge and said cabin, at least one generator for generating electrical energy, at least one engine for driving said generator, and a plurality of electrically driven, pivotal drive units for generating lift and forward thrust, wherein each drive unit has a thrust axis, said method comprising the steps of adjusting said thrust axes of said drive units downwards through said at least one opening for generating a lift for lifting the weight of said aircraft for hover flight and adjusting said thrust axes of said drive units horizontally for generating a forward thrust for cruise flight, wherein in said cruise flight said lift is generated by an aerodynamic profile of said aircraft, wherein an attitude of said aircraft is controlled by tilting said drive units and adjusting a thrust of said drive units.

11. An aircraft comprising a centrally located cabin, a wing extending around said cabin, said wing having an outer edge and having an inner edge spaced apart from said cabin to define a gap between said inner edge and said cabin, at least one generator for generating electrical power, at least one engine for driving said generator, and a plurality of electrically driven pivotal drive units arranged in said gap between said cabin and said inner edge that can be oriented vertically for generating lift or horizontally for generating forward thrust.

12. The aircraft of claim 11 wherein at least one of said drive units can be pivoted individually.

13. The aircraft of claim 11 wherein said wing is circular.

14. The aircraft of claim 11 comprising a substantially circular gap between said cabin and said wing, wherein said drive units are arranged in said gap.

15. The aircraft of claim 11 wherein at least one of said drive units can be pivoted, wherein a thrust axis of said pivotal drive unit can be pivoted to a horizontal position where said drive unit generates a forward thrust, wherein in said horizontal position said thrust axes are located above a central plane of said wing.

16. The aircraft of claim 11 comprising means for adjusting a power of at least one of said drive units individually.

* * * * *